UNITED STATES PATENT OFFICE.

MATHEW E. ROTHBERG, OF WESTMONT, PENNSYLVANIA.

PROCESS OF MAKING MAGNESIA AND PLASTER-OF-PARIS.

SPECIFICATION forming part of Letters Patent No. 641,550, dated January 16, 1900.

Application filed March 28, 1899. Serial No. 710,824. (No specimens.)

*To all whom it may concern:*

Be it known that I, MATHEW E. ROTHBERG, a citizen of the United States, and a resident of Westmont, in the county of Cambria and State of Pennsylvania, have invented certain new and useful Improvements in Processes of Preparing Magnesia and Plaster-of-Paris; and I do declare the following to be a full, clear, and exact description of the invention, such as will enable others skilled in the art to which it appertains to make and use the same.

This invention has relation to a certain new and useful process of manufacturing magnesia and also for the recovery of sulphate of lime and the manufacture therefrom of plaster-of-paris as a by-product of the process.

In the manufacture of fire-brick from the material known as "magnesia" or "oxide of magnesium" bricks are produced known as "magnesia" bricks or "basic" bricks. These bricks are used largely in the arts, and especially in steel manufacture for lining furnaces in which a high temperature is maintained. The demand for these bricks is at present large and on the increase. They are, however, expensive, for the reason that the material from which they are made is costly and difficult to obtain by the methods heretofore employed. It has heretofore been customary to derive the magnesia from the natural mineral "magnesite," which is a carbonate of magnesia nearly or quite free from calcium carbonate. This mineral is of comparatively rare occurrence, and the supply is therefore somewhat limited, a large part of it being imported. The methods employed in the reduction are also expensive, involving a series of roastings in kilns to drive off the carbonic acid and also the grinding and regrinding of the material to reduce it to a fine state.

Magnesia is present in nearly all of our common limestones as a component part in the form of the carbonate, the percentage varying in different limestones from five to fifty per cent., the balance of the stone consisting of calcium carbonate and a greater or less percentage of impurities, such as silica and oxide of iron. These limestones are known as "magnesian" limestones.

It is the object of the present process to produce from these cheap ordinary magnesian limestones a supply of magnesia suitable for the manufacture of the refractory bricks above referred to and also for use for other purposes in the arts.

In carrying out my invention I prefer to use a limestone having twenty per cent. or more of magnesia carbonate, but may use a stone having a less percentage thereof.

The process is as follows: The limestone is first reduced to a powdered condition by grinding. It is then dissolved in dilute hydrochloric acid, giving a liquor in which the magnesia is present in the form of the chloride and which also contains calcium chloride as well as insoluble silicious components which settle off to the bottom of the tank in which the dissolving process is carried on. The carbonic acid passes off as a gas ($CO_2$.) To this liquor I then add calcium oxide, (quicklime,) either in the solid form or as milk of lime, which precipitates the magnesia, leaving the lime in the form of the chloride. This precipitation is due to the fact that lime has a greater affinity for the chlorine than magnesia and displaces the latter in its combination with chlorine. After sufficient lime has been added to precipitate the magnesia contained in the liquor the latter, which now contains in solution chloride of lime only, is drawn off. The magnesia remaining in the tank is washed, filtered off, and dried, and forms a very desirable article for the manufacture of magnesian brick as well as for many other purposes in the arts. The lime contained in the liquor drawn off from the dissolving-tank is next separated from the chlorine with which it is combined as chloride of lime in the following manner: To this liquor is added sulphuric acid, which converts the lime into the form of sulphate of lime, freeing the chlorine which returns to hydrochloric acid. Sufficient sulphuric acid is added to precipitate substantially all the lime contained in solution in the liquor. The hydrochloric-acid solution is then drawn off and pumped back or otherwise returned to the tank in which the limestone was dissolved, where it is reused for dissolving a fresh quantity of limestone. The chlorine is in this manner recovered after each operation and reused with but little loss. The sulphate of lime, after being washed in water and dried, is transferred to calcining kettles or vessels and therein calcined at a temperature below 300°, after which it is ground in a suitable mill and forms a very superior grade of plaster-of-paris.

Having thus described my invention, what I claim as new, and desire to secure by Letters Patent, is—

The process of preparing magnesia and plaster-of-paris, which consists in first, dissolving limestone containing carbonate of magnesia in hydrochloric acid, and thereby producing a solution of the chlorides of calcium and magnesia; second adding calcium oxide to such solution to react with the magnesium chloride, precipitate magnesia, and form an additional portion of calcium chloride; third separating the magnesia from the calcium chloride and fourth adding sulphuric acid to the calcium chloride obtained from such first and second steps, to precipitate calcium sulphate, and recover the hydrochloric acid, and finally separating, drying and calcining the said calcium sulphate to form plaster-of-paris, substantially as specified.

In testimony whereof I affix my signature in presence of two witnesses.

MATHEW E. ROTHBERG.

Witnesses:
JOHN H. BROWN,
ALEX. N. HART.